United States Patent [19]
Koda et al.

[11] Patent Number: 5,556,888
[45] Date of Patent: Sep. 17, 1996

[54] RUBBER COMPOUNDS CONTAINING VULCANIZED SCRAP RUBBER, METHODS OF MANUFACTURING SUCH RUBBER COMPOUNDS

[75] Inventors: Tadashi Koda; Masao Hara, both of Fuchu-cho; Kiyosuke Ueki; Kei Mori, both of Kurashiki, all of Japan

[73] Assignees: Mazda Motor Corporation, Hiroshima; Kurashiki Kako Co., Ltd., Okayama, both of Japan

[21] Appl. No.: 407,420

[22] Filed: Mar. 17, 1995

[30] Foreign Application Priority Data

Mar. 18, 1994 [JP] Japan ................................ 6-048640

[51] Int. Cl.$^6$ .......................................... C08J 11/04
[52] U.S. Cl. ................ 521/44.5; 521/41; 521/42; 521/43.5; 524/270; 524/474; 524/484; 524/486; 525/237
[58] Field of Search .................. 521/44.5, 43.5, 521/42, 41; 525/237; 524/270, 474, 484, 486

[56] References Cited

U.S. PATENT DOCUMENTS

| | | | |
|---|---|---|---|
| 4,104,205 | 8/1978 | Novotny et al. | |
| 4,130,535 | 12/1978 | Coran et al. | 260/33.6 |
| 4,341,667 | 7/1982 | Lal et al. | 521/41 |
| 4,426,459 | 1/1984 | Watabe et al. | 521/44.5 |
| 4,544,675 | 10/1985 | Anderson, Jr. | 521/44.5 |
| 4,579,871 | 4/1986 | Linden et al. | 521/44.5 |
| 5,304,576 | 4/1994 | Martinez | 521/44.5 |
| 5,356,939 | 10/1994 | Burrowes et al. | 521/44.5 |
| 5,362,759 | 11/1994 | Hunt et al. | 521/44.5 |
| 5,397,825 | 3/1995 | Segrest | 521/44.5 |

OTHER PUBLICATIONS

Author: Nariyoshi Kawabata and Shinzo Yamashita Title: Reclamation of Vulcanized Rubber by Chemical Degradation: Reclamation of Scrap Tire by the Treatment with Copper (1) Chloride and Organic Amine Date of Publication: Dec., 1976 Pertinent pp.: 908–911.

Primary Examiner—Paul R. Michl
Assistant Examiner—Olga Asinovsky
Attorney, Agent, or Firm—Koda and Androlia

[57] ABSTRACT

A rubber compound obtained by compounding a raw rubber, powdered vulcanized scrap rubber with its surface partially processed via a swelling treatment, a vulcanizing agent and a vulcanizing accelerator. When manufacturing the compound, the scrap rubber is treated beforhand under ordinary temperature atomosphere by being mixed with a reclaiming agent that contains petroleum process oil.

2 Claims, No Drawings

RUBBER COMPOUNDS CONTAINING VULCANIZED SCRAP RUBBER, METHODS OF MANUFACTURING SUCH RUBBER COMPOUNDS

BACKGROUND OF THE INVENTION

1. Industrial Field of the Invention

The present invention relates to rubber compounds that make reclaimed use of vulcanized scrap rubber, methods for manufacturing such rubber compounds and reclaiming agents used in such methods.

2. Prior Art

Conventionally known methods of reclaiming vulcanized scrap rubber include the open steam method (pan method), the digestor method, the mechanical method and the UHF heater devulcanization method (U.S. Pat. No. 4,104, 205), which makes use of microwave energy. However, these methods require large-scale desulfurization equipment such as the devulcanizer, digestor, reclaimator, super mixer and UHF heating equipment. Also, since treatments are performed in each of these methods under high temperature or high pressure conditions, large quantities of energy are required and the working environments are characterized by irritating odors and high temperatures. Thus, there is much demand for improvement. Furthermore, since these methods require that the ratio of fibers and other foreign objects mixed in the scrap rubber be reduced to 1% or less, multi-step processes had to be provided for the removal of fibers and other foreign objects prior to the devulcanization process.

With regards to methods of ordinary temperature reclamation of scrap rubber, a study by Yamashita and others at Kyoto Industrial Textiles University is known (Journal of the Rubber Society of Japan, Vol. 49, No. 12, pp. 908–911, 1976). However, since a tributylamine—iron (I) chloride chemical is used in this method, it carries the problem of irritating odors and since a long period of time (20–50 hours) is required for the reclamation, there are difficulties in putting this method to practical use.

SUMMARY OF THE INVENTION

The object of the invention is to enable the obtaining of partially dissolved rubber without the use of such special devulcanization equipment as mentioned above and by simply mixing 1 or 2 types of reclaiming agents with vulcanized scrap rubber (which may have a fiber content of up to 6%) at ordinary temperatures and to manufacture rubber products that are excellent in physical performance and moldability by compounding this partially dissolved rubber with raw rubber.

The present invention consists of rubber compounds that contain vulcanized scrap rubber, methods for manufacturing such rubber compounds and reclaiming agents used in such methods.

One of the rubber compounds containing vulcanized scrap rubber is produced by compounding raw rubber, vulcanizing agent, vulcanizing accelerator, etc. with a partially dissolved product obtained by causing a vulcanized rubber reclaiming agent, consisting of 50–200 parts by weight of a petroleum process oil and 1–30 parts by weight of a peptizer, to act on 100 parts by weight of powdered, vulcanized scrap rubber.

Another rubber compound containing vulcanized scrap rubber is produced by compounding raw rubber, vulcanizing agent, vulcanizing accelerator, etc. with a partially dissolved product obtained by mixing 100 parts by weight of powdered, vulcanized scrap rubber with 80–500 parts by weight of an organic solvent and 50–200 parts by weight of a petroleum process oil.

One of the methods of manufacturing rubber compounds by the invention is characterized by mixing 100 parts by weight of powdered, vulcanized rubber with a reclaiming agent, consisting of 50–200 parts by weight of a petroleum process oil and 1–30 parts by weight of a mastication promoter, compounding raw rubber with the partially dissolved product, obtained by partial dissolution of the surface of the scrap rubber under ordinary temperature conditions, and then compounding with vulcanizing agent, vulcanizing accelerator, reinforcing agent, filler, etc. Here, ordinary temperature conditions refer to conditions with temperatures from approximately 5° C. to 30° C. and include cases wherein some humidification is performed when the air temperature is low.

Another method of manufacturing rubber compounds containing vulcanized scrap rubber is characterized by mixing 100 parts by weight of powdered, vulcanized rubber with 80–500 parts by weight of an organic solvent as a first reclaiming agent to swell the powdered rubber under ordinary temperature conditions, then mixing 50–200 parts by weight of a petroleum process oil as a second reclaiming agent and compounding raw rubber with the partially dissolved product, obtained by partial dissolution of the surface of the scrap rubber at ordinary temperatures, and then compounding with vulcanizing agent, vulcanizing accelerator, reinforcing agent, filler, etc.

Here, BR, EPDM, IR, IIR, NR or SBR may be favorably used as the vulcanized scrap rubber.

The vulcanized scrap rubber reclaiming agent used in the invention is one in which 100 parts by weight of a petroleum process oil is mixed with 0.5–60 parts by weight of peptizer or one which consists of 80–500 parts by weight of an organic solvent and/or 50–200 parts by weight of a petroleum process oil that are to act on 100 parts by weight of vulcanized scrap rubber. Here it is preferable to make combined use of the organic solvent as a first reclaiming agent and the petroleum process oil as a second reclaiming agent in the manufacturing method described above. The partially dissolved product, obtained by adding such a reclaiming agent to powdered vulcanized rubber, is useful as the intermediate product to be mixed with raw rubber.

The petroleum process oil can be selected suitably from among general rubber compounding agents such as naphthene, aromatic, paraffin and other process oils. It is preferable to use a process oil that is suited to the raw rubber to be compounded.

50–200 parts by weight and preferably 80–150 parts by weight of the petroleum process oil is suitably compounded with 100 parts by weight of powdered rubber. Adequate swelling cannot be expected if the amount of oil is less than 50 parts by weight while more than the necessary amount of processing oil will be compounded if the amount of oil is more than 200 parts by weight and this will be unfavorable since it conflicts with the intention of compounding the maximum possible amount of dissolved product consisting of vulcanized scrap rubber.

The peptizer can be selected suitably from among general peptizers for rubber such as a mixture of pentachlorothiophenol and an activating additive, the zinc salt of pentachlorothiophenol, mixed dixylyl disulfides, mixed diaryl disulfides, di-(o-benzamidophenyl) disulfide, the zinc salt of 2-benzamidothiophenol and alkylated phenol sulfide. It is preferable to use a peptizer that is suited to the raw rubber to be compounded.

1–30 parts by weight and preferably 2–10 parts by weight of the peptizer is suitably compounded with 100 parts by weight of powdered rubber. Adequate mastication effects cannot be expected if the amount is less than 1 part by weight while further promotion of mastication cannot be expected even if the amount of peptizer exceeds 30 parts by weight and this is not appropriate since it will only lead to increases in cost.

The use of peptizers as reclaiming agents or reclaiming oils for vulcanized scrap rubber has been known priorly. However, even with low temperature type peptizers, such effects can only be obtained by heating to 60° C. or more and applying mechanical shear forces. Thus, ordinary temperature reclamation is made possible for the first time by the invention which comprises a combination of a petroleum process oil and a peptizer.

The organic solvent can be selected from among general industrial solvents such as pentane, hexane, heptane, normal and iso-octane, cyclopentane, cyclohexane, benzene, toluene, o-, m- and p-xylene, ethylbenzene, o-, m- and p-diethylbenzene, n-propylbenzene and isopropyl benzene. Among these, aromatic hydrocarbons are particularly favorable.

80–500 parts by weight and preferably 100–250 by weight of the organic solvent is suitably mixed with 100 parts by weight of powdered rubber. Adequate swelling cannot be expected if the amount of solvent is less than 80 parts by weight while an amount of solvent of 500 parts by weight or more is not favorable since a longer time will be required to distill off the solvent after the swelling treatment and the solvent costs will become high.

The amount of partially dissolved vulcanized scrap rubber, which is obtained by the abovementioned treatments and which is to be compounded with raw rubber, can be varied over a wide range according to the required quality of the rubber product to be obtained and is not restricted in particular. 100 parts by weight of raw rubber may be compounded with 10–300 parts by weight and preferably 20–200 parts by weight of the partially dissolved rubber.

DETAILED DESCRIPTION OF THE INVENTION

Partially dissolved vulcanized scrap rubber is obtained by causing a reclaiming agent, consisting of a petroleum process oil and a peptizer, to act on powdered vulcanized scrap rubber and a rubber compound, that is particularly excellent for die molding, is obtained by compounding the partially dissolved rubber with raw rubber, vulcanizing agent, vulcanizing accelerator, etc.

In the manufacturing process wherein the rubber compound containing vulcanized scrap rubber is produced by compounding raw rubber, vulcanizing agent, vulcanizing accelerator, etc. with a partially dissolved product obtained by mixing 100 parts by weight of powdered vulcanized scrap rubber with 80–500 parts by weight of organic solvent and 50–200 parts by weight of petroleum process oil, the organic solvent swells and dissolves the vulcanized scrap rubber so that its 3-dimensionally cross-linked structure is plasticized and so that the scrap rubber is dispersed in a colloidal form while the petroleum process oil partially dissolves only the surface part of the vulcanized scrap rubber. Since this is performed at ordinary temperatures, the dissolution stops at the surface and does not progress into the inner parts of the rubber and, furthermore, there is no formation of over-vulcanized rubber. Reclaimed rubber with excellent extrusion moldability can thus be obtained without the degradation of physical properties.

Reclaimed rubber can be obtained without the degradation of physical properties since these rubber reclamation reactions are ordinary temperature processes that are limited to the plasticization of the cross-linked structure of the scrap rubber and do not progress to the scission of the sulfur cross-links or the scission of the main chain (depolymerization).

Severe treatment conditions, such as high temperature, high pressure, and high shear rate, were required with conventional reclaiming agents because of their poor compatibility with rubber. In contrast, the process oil used in the invention has been used intrinsically as softening agents for rubber and is thus excellent in compatibility with rubber and can swell the surface of the rubber even at ordinary temperatures. Furthermore, since the peptizer acts as a catalyst that promotes the peroxidation reaction of rubber molecules, partially dissolved rubber can be obtained in a short time at ordinary temperatures. Also, the organic solvent alone acts as a reclaiming agent which swells and partially dissolves the vulcanized scrap rubber at ordinary temperatures by plasticizing the 3 dimensionally cross-linked structure of the rubber and dispersing the rubber in a colloidal form.

EXAMPLE 1

150 parts by weight of naphthene process oil (Flex 1400N; made by Fuji Kosan Co. Ltd.) and 2 parts by weight of the peptizer, di-(o-bezamidephenyl) disulfide (Peptor 3S; made by Kawaguchi Chemicals Co. Ltd.) were added to 100 parts by weight of powdered rubber (made by Hayakawa Rubber Co. Ltd.). The powdered rubber is a powdered scrap tire product that mainly consists of natural rubber and styrene-butadiene rubber and completely passes through a 30 mesh. Upon stirring and then letting the mixture stand at an ordinary temperature for 8 hours, a partially dissolved product, with only the surface being partially dissolved, was obtained.

The various compounding agents shown in the upper rows of Table 1 were then mixed with (1) vulcanized rubber alone, (2) the abovementioned partially dissolved product, (3) the abovementioned powdered scrap tire product and (4) commercially available tire-reclaimed rubber (RS-0; made by Hayakawa Rubber Co. Ltd.). Table 1 shows the physical properties of the products obtained by vulcanizing these mixtures for 10 minutes at 170° C.

As is clear from Table 1, the compound (2), obtained by the method of the invention, is not only excellent in comparison to (3), in which scrap rubber powders were compounded as they were, and to (4), which is compounded from commercially available reclaimed rubber, but also exhibits excellent physical properties that compare favorably with (1), which is compounded without any scrap rubber, etc.

EXAMPLE 2

A vulcanized product of an inner-layer reinforced hose (intermediate reinforcing fiber=rayon; mixing ratio of fiber =6%), having an EPDM rubber compound, with the composition I, shown in Table 2, disposed at the inner and outer layers thereof, was powdered with a descrifier (made by Kobe Machines, Co. Ltd.). 80 parts by weight of paraffin process oil (Sunpar #2280; made by Sun Oil Co. Ltd.) and 10 parts by weight of a peptizer, ie. ① di-(o-benzamidophenyl) disulfide (Peptor 3S; made by Kawaguchi Chemicals Co. Ltd.) or ② a pentachlorothiophenol mixture (Renacid 7; made by Bayer Corp.), were added to 100 parts by weight of the portion of the above powdered rubber that passed completely through a 15 mesh. Upon stirring and then letting the mixtures stand at an ordinary temperature for 8 hours, partially dissolved products, (A) and (B), were obtained from ① and ② respectively.

The case, wherein the 15 mesh powdered rubber (C) was used as it is, and the case, wherein a partially swelled product (D) was obtained by adding 40 parts by weight of paraffin process oil (Sunpar #2280) to 100 parts by weight of the 15 mesh powdered rubber and stirring and then letting the mixture stand for 8 hours at an ordinary temperature, are indicated as comparison examples.

Molding shrinkage tests were performed by determining the rates of change in the length direction of a rubber sheet that was vulcanized and molded in a mold with a thickness of 2 mm, a width of 180 mm and a length of 210 mm (values determined at five positions were averaged).

The lower rows of Table 3 show the physical properties of the products obtained by vulcanizing, at 170° C. for 10 minutes, the rubber compounds obtained by mixing the abovementioned reclaimed vulcanized rubber with the various compounding agents shown in the upper rows of Table 3. The results of the molding shrinkage tests are also shown in the lowermost row of Table 3.

As is clear from Table 3, the products, obtained by compounding the partially dissolved products (A) and (B) by the invention, indicate physical properties that are much better than the product compounded from untreated powdered rubber (C) or the product compounded from the partially swelled rubber (D) that was obtained by simply applying process oil. The molding shrinkage, which is a disadvantage of the untreated powdered rubber (C), has also been improved.

EXAMPLE 3

A vulcanized product of an inner-layer reinforced hose (intermediate reinforcing fiber=rayon; mixing ratio of fiber= 3%), having an EPDM-rubber compound, with the composition I shown in Table 2, disposed at the inner and outer layers thereof, was powdered with a descrifier (made by Kobe Machines, Co. Ltd.). 100 parts by weight of an organic solvent ((① toluene, ② xylene, ③ iso-octane (2,2,4-trimethylpentane)) were added to 100 parts by weight of the portion of the above powdered rubber that passed completely through a 15 mesh. The mixtures were stirred and then left to stand at an ordinary temperature for 8 hours. After distilling off the solvent under reduced pressure, 150 parts by weight of paraffin process oil (Sunpar #2280; made by Sun Oil Co. Ltd.) and 10 parts by weight of a peptizer, di-(o-benzamidophenyl) disulfide (Peptor 3S; made by Kawaguchi Chemicals Co. Ltd.), were added to each mixture. Upon stirring and then letting the mixtures stand for 8 hours at ordinary temperatures, partially dissolved products, (E), (F) and (G), were obtained from ①, ② and ③ respectively. The 15 mesh powdered rubber (C) was also included in the evaluations as a comparison example.

Table 4 shows the physical properties of the products obtained by vulcanizing, at 170° C. for 20 minutes, the rubber compounds obtained by mixing the abovementioned reclaimed vulcanized rubbers with the various compounding agents shown in the upper rows of Table 4. Also included are results of extrusion processability evaluations that were carried out in compliance with ASTM D2230.

As is clear from Table 4, the products reclaimed using organic solvents (in particular, aromatic hydrocarbons) do not show degradation of physical properties and are also excellent in extrusion processability.

EXAMPLE 4

A vulcanized product of an inner-layer reinforced hose (intermediate reinforcing fiber=rayon; mixing ratio of fiber= 3%), having an EPDM-rubber compound, with the composition I shown in Table 2, disposed at the inner and outer layers thereof, was powdered with a descrifier (made by Kobe Machines, Co. Ltd.). 250 parts by weight of an organic solvent; ie. toluene, were added to 100 parts by weight of the portion of the above powdered rubber that passed completely through a 15 mesh. The mixture was stirred and then left to stand at an ordinary temperature for 8 hours. After distilling off the solvent under reduced pressure, 80 parts by weight of paraffin process oil (Sunpar #2280; made by Sun Oil Co. Ltd.) and 10 parts by weight of a peptizer; ie. di-(o-benzamidophenyl) disulfide (Peptor 3S; made by Kawaguchi Chemicals Co. Ltd.), were added. Upon stirring and then letting the mixture stand for 8 hours at ordinary temperatures, a partially dissolved product, (H), was obtained.

Table 4 shows the physical properties of the products obtained by vulcanizing, at 170° C. for 20 minutes, the rubber compound obtained by mixing this partially dissolved product (H) with the various compounding agents shown in the upper rows of Table 4. Also included are results of extrusion processability evaluations that were carried out in compliance with ASTM D2230.

Furthermore, an inner tube was extruded from the rubber compound with the composition IX shown in Table 4 and containing the partially dissolved product (H). An inner pressure of 0.2 $kgf/cm^2$ was then applied and a reinforcing layer, with braids or spiral cord knits, was formed on the outer periphery of this inner tube. A skin, formed from a rubber compound containing the partially dissolved product (H) obtained by the invention, was then applied to form a bare tube hose in the unvulcanized condition. This bare tube hose was held with straight or bent pipes to form shapes according to the parts to be used and heated and vulcanized to form a heater hose (inner diameter: $\phi$16 mm, outer diameter: $\phi$24 mm). Table 5 shows the results of performance evaluation tests carried out in compliance with JIS D2602. As is clear from Table 5, the heater hose, formed from the rubber obtained by the simplified reclamation procedure of the invention, retains adequate performance for practical use.

The following effects were obtained by the invention:

① It has become possible to perform ordinary temperature reclamation of vulcanized scrap rubber. This can be performed without energy consumption and thus enables energy savings.

② Since special facilities, such as those required in conventional reclamation of vulcanized scrap rubber, are not needed, facility investments are not needed.

③ Since the vulcanized scrap rubber needs only to be dispersed uniformly and does not need to be removed of fibers, multi-step fiber removal processes (gyroshifter, vibrating screen, electrostatic separation, cyclone, etc.) as well as alkali treatment are not needed.

④ Offensive odors do not remain on the reclaimed rubber product.

⑤ The powdering costs are low since the powdered rubber needs only to be powdered coarsely.

⑥ The working environment is improved since irritating odors are not generated, high temperature conditions do not arise, etc.

The invention therefore enables the reclaimed use of various rubber wastes and old tires that arise from used industrial, household and other rubber products and serves to help the beautification and maintenance of the global environment and the effective use of natural resources.

TABLE 1

Composition and Physical Properties of a Rubber Compound Containing Reclaimed Rubber

| Composition (*) | | (1) | (2) | (3) | (4) |
|---|---|---|---|---|---|
| Natural rubber (RSS #3) | | 40 | 40 | 40 | 40 |
| BR (Diene NF35; made by Asahi Kasei Industries Co. Ltd.) | | 60 | 60 | 60 | 60 |
| SRF carbon black | | 75 | 75 | 75 | 75 |
| Naphthene process oil (Flex 1400N) | | 40 | 10 | 40 | 40 |
| Zinc oxide | | 5 | 5 | 5 | 5 |
| Stearic acid | | 1 | 1 | 1 | 1 |
| N-isopropyl-N'-phenyl-P-phenylenediamine | | 1 | 1 | 1 | 1 |
| N-oxydiethylene-2-benzothiazole sulfonamide | | 1 | 1 | 1 | 1 |
| Tetramethylthiuram disulfide | | 0.2 | 0.3 | 0.3 | 0.3 |
| Sulfur | | 2 | 2.5 | 2.5 | 2.5 |
| Partially dissolved vulcanized rubber compound (this invention) | | 0 | 50.4 | 0 | 0 |
| Powdered tire rubber (30 mesh) | | 0 | 0 | 20 | 0 |
| Reclaimed tire rubber (RS-O; made by Hayakawa Rubber Co. Ltd.) | | 0 | 0 | 0 | 20 |
| Dry physical properties In compliance with JIS K 6301 | Hardness (Hs - JIS A) | 61 | 60 | 60 | 60 |
| | Tensile strength (Kgf/cm$^2$) | 142 | 143 | 103 | 121 |
| | Elongation (%) | 400 | 400 | 320 | 390 |

*: All compositions are in parts by weight.

TABLE 2

Composition and Physical Properties of a Rubber Compound That Does Not Contain Reclaimed Rubber

| Composition (*) | | I |
|---|---|---|
| EPDM (Esprene 502; made by Sumitomo Chemicals Co. Ltd.) | | 100 |
| SRF carbon | | 70 |
| GPF carbon | | 80 |
| Heavy calcium carbonate | | 50 |
| Paraffin process oil | | 100 |
| Zinc oxide | | 5 |
| Stearic acid | | 1 |
| Diethylene glycol | | 0.5 |
| Dibenzothiazole disulfide | | 1 |
| Tetramethylthiuram disulfide | | 0.5 |
| Dipentamethylenethiuram hexasulfide | | 0.5 |
| Sulfur | | 1.5 |
| Dry physical properties In compliance with JIS K 6301 | Hardness (Hs - JIS A) | 71 |
| | Tensile strength (Kgf/cm$^2$) | 113 |
| | Elongation (%) | 330 |
| Molding shrinkage | Average shrinkage (%) | 2.26 |
| Extrudability In compliance with method A of ASTM D2230-77 | Conditions of swell and generation of cells | 4 |
| | Continuity and sharpness of 30° edge | 3 |
| | Smoothness of surface skin | 4 |
| | Sharpness and continuity of edges with angles besides 30° | 4 |
| | Total points | 15 |

*: All compositions are in parts by weight.

TABLE 3

Composition and Physical Properties of a Rubber Compound Containing Reclaimed Rubber

| Composition (*) | | II | III | IV | V |
|---|---|---|---|---|---|
| EPDM (Esprene 502; made by Sumitomo Chemicals Co. Ltd.) | | 100 | 100 | 100 | 100 |
| SRF carbon | | 70 | 70 | 70 | 70 |
| GPF carbon | | 80 | 80 | 80 | 80 |
| Heavy calcium carbonate | | 50 | 50 | 50 | 50 |
| Paraffin process oil | | 80 | 80 | 100 | 90 |
| Zinc oxide | | 5 | 5 | 5 | 5 |
| Stearic acid | | 1 | 1 | 1 | 1 |
| Diethylene glycol | | 0.5 | 0.5 | 0.5 | 0.5 |
| Dibenzothiazole disulfide | | 1 | 1 | 1 | 1 |
| Tetramethylthiuram disulfide | | 0.5 | 0.5 | 0.5 | 0.5 |
| Dipentamethylenethiuram hexasulfide | | 0.5 | 0.5 | 0.5 | 0.5 |
| Sulfur | | 1.5 | 1.5 | 1.5 | 1.5 |
| Partially dissolved product (A) | | 47.5 | 0 | 0 | 0 |
| Partially dissolved product (B) | | 0 | 47.5 | 0 | 0 |
| 15 mesh powdered rubber (C) | | 0 | 0 | 25 | 0 |
| Partially swelled product (D) | | 0 | 0 | 0 | 35 |
| Dry physical properties In compliance with JIS K 6301 | Hardness (Hs - JIS A) | 71 | 69 | 68 | 67 |
| | Tensile strength (Kgf/cm$^2$) | 116 | 118 | 90 | 95 |
| | Elongation (%) | 330 | 350 | 230 | 330 |
| Molding Shrinkage | Average shrinkage (%) | 2.25 | 2.25 | 3.06 | 2.45 |

*: All compositions are in parts by weight.

TABLE 4

Composition and Physical Properties of Rubber Compound Containing Reclaimed Rubber

| Composition (*) | | VI | VII | VIII | IV | IX |
|---|---|---|---|---|---|---|
| EPDM (Esprene 502; made by Sumitomo Chemicals Co. Ltd.) | | 100 | 100 | 100 | 100 | 100 |
| SRF carbon | | 70 | 70 | 70 | 70 | 70 |
| GPF carbon | | 80 | 80 | 80 | 80 | 80 |
| Heavy calcium carbonate | | 50 | 50 | 50 | 50 | 50 |
| Paraffin process oil | | 62.5 | 62.5 | 62.5 | 100 | 80 |
| Zinc oxide | | 5 | 5 | 5 | 5 | 5 |
| Stearic acid | | 1 | 1 | 1 | 1 | 1 |
| Diethylene glycol | | 0.5 | 0.5 | 0.5 | 0.5 | 0.5 |
| Dibenzothiazole disulfide | | 1 | 1 | 1 | 1 | 1 |
| Tetramethylthiuram disulfide | | 0.5 | 0.5 | 0.5 | 0.5 | 0.5 |
| Dipentamethylenethiuram hexasulfide | | 0.5 | 0.5 | 0.5 | 0.5 | 0.5 |
| Sulfur | | 1.5 | 1.5 | 1.5 | 1.5 | 1.5 |
| Partially dissolved product (E) | | 65 | 0 | 0 | 0 | 0 |
| Partially dissolved product (F) | | 0 | 65 | 0 | 0 | 0 |
| Partially dissolved product (G) | | 0 | 0 | 65 | 0 | 0 |
| 15 mesh powdered rubber (C) | | 0 | 0 | 0 | 25 | 0 |
| Partially swelled product (H) | | 0 | 0 | 0 | 0 | 47.5 |
| Dry physical properties In compliance with JIS K 6301 | Hardness (Hs - JIS A) | 68 | 68 | 69 | 68 | 68 |
| | Tensile strength (Kgf/cm$^2$) | 115 | 112 | 106 | 90 | 112 |
| | Elongation (%) | 320 | 330 | 310 | 230 | 320 |
| Extrudability In compliance with method A of ASTM D2230-77 | Conditions of swell and generation of cells | 4 | 4 | 3 | 2 | 4 |
| | Continuity and sharpness of 30° edge | 3 | 3 | 2 | 1 | 3 |
| | Smoothness of surface skin | 4 | 4 | 3 | 1 | 4 |
| | Sharpness and continuity of edges with angles besides 30° | 3 | 4 | 2 | 2 | 4 |
| | Total points | 14 | 15 | 10 | 6 | 15 |

*: All compositions are in parts by weight.

TABLE 5

Performance of Heater Hose Product Disposed with Rubber Compounds Containing Reclaimed Rubber
(Compatibility with JIS D2602)

| Rubber composition (*) | | | I | IX | Standards |
|---|---|---|---|---|---|
| Specifications of reinforcing layer | | | Rayon #20/8 No. of frames = 24 | Rayon #20/8 No. of frames = 24 | |
| Dimensions of the hose | | | Inner diameter: φ16 mm Outer diameter: φ24 mm | Inner diameter: φ16 mm Outer diameter: φ24 mm | |
| Pressure resistance tests | Pressure resistance test | Rate of change of outer diameter ΔD (%) at 5 kgf/cm² | +6.8 | +7.0 | 15 or less |
| | Bursting test | Burst strength (kgf/cm²) | 24 | 24 | 17 or more |
| | Negative pressure test | Rate of change of outer diameter ΔD (%) at −200 mmHg | −1.3 | −1.5 | within −10 |
| Fatigue resistance test | Repeated vibration test | Appearance | Pass | Pass | No bursting, blistering, etc. |
| | | Rate of change of outer diameter (%) | +2.5 | +2.5 | 10 or less |
| Peel test | | Adhesion strength (kgf/cm²) | 4.5 | 4.6 | 1 or more |
| Heat aging test | | Appearance | Pass | Pass | No cracks, bursting, etc. |
| | | Burst strength (kgf/cm²) | 21 | 21 | 12 or more |
| Low temperature test | | Appearance | Pass | Pass | No cracks, bursting, etc. |
| Ozone test | | Appearance | Pass | Pass | No anomalies such as formation of cracks |

(*) Details of the testing methods are in compliance with JIS D 2602.

We claim:

1. A rubber compound comprising:

a raw rubber;

powdered vulcanized scrap rubber, a surface of said scrap rubber being partially processed via a swelling treatment; and a vulcanizing agent and vulcanizing accelerator; wherein said raw rubber, scrap rubber, vulcanizing agent and vulcanizing accelerator are compounded together after said scrap rubber is treated under ordinary temperature without heating and atmosphere conditions by mixing thereto a reclaiming agent which contains petroleum process oil consisting of petroleum process oil and a peptizer selected from the group consisting of a mixture of pentachlorothiophenol and an activating additive, the zinc salt of pentachlorothiophenol, mixed dixylyl disulfides, mixed diaryl disulfides, di-(o-benzamidophenyl) disulfide, the zinc salt of 2-benzamidothiophenol and alkylated phenol sulfide and said partially dissolved product is obtained by using 50–200 parts by weight of petroleum process oil and 1–30 parts by weight of peptizer as said reclaiming agent so as to act on 100 parts by weight of powdered vulcanized scrap rubber.

2. A rubber compound comprising:

a raw rubber;

powdered vulcanized scrap rubber, a surface of said scrap rubber being partially processed via a swelling treatment; and a vulcanizing agent and a vulcanizing accelerator; wherein said raw rubber, scrap rubber, vulcanizing agent and vulcanizing accelerator are compounded together after said scrap rubber is treated under ordinary temperature without heating and atmosphere conditions by mixing thereto a reclaiming agent which contains petroleum process oil consisting of an organic solvent selected from the group consisting of pentane, hexane, heptane, normal and iso-octane, cyclopentane, cyclohexane, benzene, toluene, o-, m- and p-xylene, ethylbenzene, o-, m- and p-diethylbenzene, n-propylbenzene and isopropyl benzene as a first reclaiming agent and petroleum process oil as a second reclaiming agent, and said partially dissolved product is obtained by mixing 80–500 parts by weight of said first reclaiming agent to 100 parts by weight of said powdered vulcanized scrap rubber so that surface of said scrap rubber is swelled and then by adding thereto 50–200 parts by weight of said second reclaiming agent.

* * * * *